United States Patent [19]
Sakamoto

[11] Patent Number: 6,101,311
[45] Date of Patent: Aug. 8, 2000

[54] MOVING PICTURE AND AUDIO DATA REPRODUCING METHOD AND SYSTEM THEREFOR

[75] Inventor: Hideo Sakamoto, Tokyo, Japan

[73] Assignee: NEC Corporation, Tokyo, Japan

[21] Appl. No.: 08/888,071

[22] Filed: Jul. 3, 1997

[30] Foreign Application Priority Data

Jul. 4, 1996 [JP] Japan ................................. 8-174897

[51] Int. Cl.⁷ ........................ H04N 5/783; H04N 7/173
[52] U.S. Cl. .............................. 386/69; 386/125; 348/7; 348/13
[58] Field of Search ................................. 386/6–8, 33, 45, 386/68–70, 81, 82, 111, 98, 125–126; 348/2, 6–9, 12, 13; 455/3.1, 4.2, 5.1; H04N 7/10, 7/173, 5/76, 5/783, 5/92, 9/79

[56] References Cited

U.S. PATENT DOCUMENTS

| | | | |
|---|---|---|---|
| 5,610,841 | 3/1997 | Tanaka et al. | 348/12 |
| 5,659,350 | 8/1997 | Hendricks et al. | 348/6 |
| 5,732,217 | 3/1998 | Emura | 348/7 |
| 5,922,048 | 7/1999 | Emura | 348/7 |

FOREIGN PATENT DOCUMENTS

| | | |
|---|---|---|
| 63-288556 | 11/1988 | Japan . |
| 4-180489 | 6/1992 | Japan . |
| 7-115630 | 5/1995 | Japan . |
| 8-154242 | 6/1996 | Japan . |
| 9-275545 | 10/1997 | Japan . |
| 2229889 | 10/1990 | United Kingdom . |

OTHER PUBLICATIONS

Japanese Office Action issued May 11, 1999 in connection with a related application.
English–language translation of pertinent portions of May 11, 1999 JPO Office Action.
PC Magazine, vol. 13, No. 6, p. 282(4), Mar. 29, 1994.

*Primary Examiner*—Thai Tran
*Attorney, Agent, or Firm*—Ostrolenk, Faber, Gerb & Soffen, LLP

[57] ABSTRACT

The present invention is a moving picture data reproducing method for a system having a server and a terminal, the server sending compressed moving picture and audio data to the terminal corresponding to a command issued from the terminal, the terminal reproducing moving picture and audio data corresponding to the compressed moving picture and audio data, the method comprising the steps of causing the server to start sending the compressed moving picture and audio data that start from a designated skip position after a lapse of a predetermined time period without a protocol performed in a control portion when the terminal sends a skip reproduction command to the server while the terminal is reproducing a moving picture and causing the terminal to reproduce the moving picture that from the designated skip position when the terminal receives the compressed moving picture data that start from the designated skip position.

A part of communication performed in control portions is omitted. Thus, processes after a skip reproduction request is issued until moving picture and audio data are reproduced are performed at a high speed.

15 Claims, 5 Drawing Sheets

MOVING PICTURE AND AUDIO DATA REPRODUCING METHOD AND SYSTEM THEREFOR

BACKGROUND OF THE INVENTION

1. Field of the Invention

The present invention relates to a moving picture and audio data reproducing method for reproducing moving picture and audio data from compressed moving picture and audio data suitable for multimedia communication and a system therefor.

2. The Prior Art

As communication technologies and the processing speed of machines and instruments such as computers processing communication data have been improved, and also, these machines and instruments have been popularized, multimedia communication including picture data along with conventional text and audio data have been widely used. In such multimedia communication, since the amount of data to be processed is large, the process time for communicating data largely depends on the efficiency of the reproduction process performed by communication terminal units.

In a first related art reference (Japanese Patent Laid-Open Publication No. 7-115630), the time period for sending data that represent performance specifications to be exchanged between a local terminal unit and a remote terminal unit through a communication line is reduced. In other words, unlike the conventional system of which the all performance specifications of the local terminal unit are communicated in the negotiation stage, this related art reference discloses that only the ability specifications corresponding to predetermined communication mode are sent to the remote terminal unit so as to reduce the time period for which the performance specifications is sent. In addition, with a recognizing circuit that recognizes the remote terminal unit and a storing circuit that stores the performance specifications of the remote terminal, in later negotiations, the performance specifications stored in the storing circuit are used, whereby the time period thereof is reduced.

A second related art reference (Japanese Patent Laid-Open Publication No. 4-180489) discloses a technology for displaying a picture on a monitor display of a TV phone. In this technology, due to the fact that pictures are not frequently changed in the communication start phase, a plurality of desired picture signals are sent and stored in a memory beforehand. Thus, when pictures are displayed, only address information of the memory is sent. Thus, the picture transmission time can be apparently reduced.

A third related art reference (Japanese Patent Laid-Open Publication No. 63-288556) discloses a picture communication method for sending and receiving picture information with a telephone line. In this method, after a server has sent a transmission start signal composed of a predetermined DTMF signal to a terminal for a predetermined time period corresponding to a transmission request operation of the sending side, the server starts sending picture information with a high speed modem. Only when the terminal has received the transmission start signal for the predetermined time period or longer, it starts receiving the picture information with the high-speed modem. Thus, in comparison with the conventional facsimile communication and so forth, the transmission procedure is remarkably simplified. In particular, when the amount of picture information is small, the communication can be effectively performed.

However, in the conventional technologies for reproducing picture data, when the current picture being reproduced is skipped to a desired picture, it takes a time. In other words, the reproducing process cannot be smoothly performed. This is because there are control portions in the terminal that reproduces moving picture data and also in the server that sends the compressed moving picture data. And it takes a time for these control portions to communicate each other by commands according to predetermined protocol.

SUMMARY OF THE INVENTION

An object of the present invention is to provide a moving picture and audio data reproducing method for allowing the current moving picture reproduced in a multimedia communication terminal to be skipped to a desired moving picture in a reduced time period so as to improve the operation response and a moving picture data reproducing system therefor.

According to a first aspect of the present invention, there is provided a moving picture data reproducing method for a system having a server and a terminal, the server sending compressed moving picture and audio data to the terminal corresponding to a command issued from the terminal, the terminal reproducing moving picture and audio data corresponding to the compressed moving picture and audio data, which comprises the steps of causing the server to start sending the compressed moving picture and audio data that start from a designated skip position after a lapse of a predetermined time period without a protocol performed in a control portion when the terminal sends a skip reproduction command to the server while the terminal is reproducing moving picture and audio data, and causing the terminal to reproduce the moving picture and audio data that start from the designated skip position when the terminal receives the compressed moving picture and audio data that start from the designated skip position from the server.

According to a second aspect of the present invention, there is provided a moving picture data reproducing method for a moving picture data reproducing system having a multimedia server function portion for storing compressed moving picture and audio data and sending the compressed moving picture and audio data corresponding to a request, an application function portion having a user interface, a multimedia data processing portion for reproducing a moving picture and audio data from the compressed moving picture and audio data, and a device driver function portion for controlling the multimedia data processing portion corresponding to the request issued from the application function portion, which comprises the steps of causing the application function portion to issue a request for compressed moving picture and audio data at a skip position to the multimedia server function portion when the application function portion has received a skip reproduction command from the user; causing the multimedia server function portion to send a reply against the request for compressed moving picture and audio data at the skip position to the application function portion; causing the application function portion to issue a skip position data reproduction command to the device driver function portion when the application function portion has received a reply against the request for compressed moving picture and audio data at a skip position from the multimedia server function portion; causing the device driver function portion to initialize the multimedia data processing portion when the device driver function portion has received the skip position data reproduction command; causing the device driver function portion to send a reply against the skip position data reproduction command to the application function portion when the device driver function portion has completed the initializing;

causing the multimedia server function portion to send the compressed moving picture and audio data that start from the designated skip position to the multimedia data processing portion after a lapse of a predetermined time period after the multimedia server function portion has received the request for the compressed moving picture and audio data at the skip position from the application function portion; causing the multimedia data processing portion to start reproducing moving picture and audio data corresponding to the compressed moving picture and audio data that start from the designated skip position and to send a reproduction start detection signal to the device driver function portion when the multimedia data processing portion has received the compressed moving picture and audio data at the designated skip position; and causing the device driver function portion to send a reproduction start reply to the application function portion when the device driver function portion has received the reproduction start detection signal from the multimedia data processing portion.

The initializing is performed by the steps of freezing a screen; prohibiting the compressed moving picture and audio data from being fed to a storing means of the multimedia data processing portion from a system processing portion of the multimedia data processing portion; clearing the contents of the storing means; issuing a command to a reproduction processing portion of the multimedia data processing portion for starting reproducing moving picture and audio data corresponding to the compressed moving picture and audio data that start from the designated skip position and generating the reproduction start detection signal when the compressed moving picture and audio data at the designated skip position are fed to the reproduction processing portion of the multimedia data processing portion; issuing a command for synchronizing audio data with picture data at the time reproducing the compressed moving picture and audio data at the designated skip position to the reproduction processing portion; setting a time period for prohibiting the compressed moving picture and audio data from being fed to the storing portion from the system processing portion and waiting for the time period, and enabling the compressed moving picture and audio data to be fed to the storing means from the system processing portion.

The moving picture data reproducing method further comprises the step of defrosting the screen when the device driver function portion has received the reproduction start detection signal from the reproduction processing portion.

According to a third aspect of the present invention, there is provided a moving picture data reproducing system having a multimedia server function portion for storing compressed moving picture and audio data and sending the compressed moving picture and audio data corresponding to a request, an application function portion having a user interface, a multimedia data processing portion for reproducing moving picture and audio data with the compressed moving picture and audio data, and a device driver function portion for controlling the multimedia data processing portion corresponding to the request issued from the application function portion, which comprises a means for causing the application function portion to issue a request for the compressed moving picture and audio data that start from a skip position to the multimedia server function portion when the application function portion has received a skip reproduction command from the user; a means for causing the multimedia server function portion to send a reply against the request for the compressed moving picture and audio data to the application function portion; a means for causing the application function portion to issue a skip position data reproduction command to the device driver function portion when the application function portion has received the reply against the request for the compressed moving picture and audio data from the multimedia server function portion; a means for causing the device driver function portion to initialize the multimedia data processing portion when the device driver function portion has received the skip position data reproduction command; a means for causing the device driver function portion to send a reply against the skip position data reproduction command to the application function portion when the device driver function portion has completed the initializing process; a means for causing the multimedia server function portion to send the compressed moving picture and audio data that start from the designated skip position to the multimedia data processing portion after a lapse of a predetermined time period after the multimedia server function portion has received the request for the compressed moving picture and audio data from the application function portion; a means for causing the multimedia data processing portion to start reproducing moving picture and audio data corresponding to the compressed moving picture and audio data that start from the designated skip position and to send a reproduction start detection signal to the device driver function portion when the multimedia data processing portion has received the compressed moving picture and audio data at the designated skip position; and a means for causing the device driver function portion to send a reproduction start reply to the application function portion when the device driver function portion has received the reproduction start detection signal.

The initializing is performed by the steps of freezing a screen; prohibiting the compressed moving picture and audio data from being fed to a storing means of the multimedia data processing portion from a system processing portion of the multimedia data processing portion; clearing the contents of the storing means; issuing a command to a reproduction processing portion of the multimedia data processing portion for starting reproducing the moving picture and audio data corresponding to the compressed moving picture and audio data that start from the designated skip position and generating the reproduction start detection signal when the compressed moving picture and audio data at the designated skip position are fed to the reproduction processing portion of the multimedia data processing portion; issuing a command for synchronizing audio data with picture data at the time reproducing the moving picture and audio data at the designated skip position to the reproduction processing portion; setting a time period for prohibiting the compressed moving picture and audio data to be fed to the storing portion from the system processing portion and waiting for the time period; and enabling the compressed moving picture and audio data to be fed to the storing means from the system processing portion.

The moving picture data reproducing system further comprises a means for defrosting the screen when the device driver function portion has received the reproduction start detection signal from the reproduction processing portion.

These and other objects, features and advantages of the present invention will become more apparent in light of the following detailed description of the best mode embodiments, as illustrated in the accompanying drawings.

DESCRIPTION OF PREFERRED EMBODIMENTS

Before explaining embodiments of the present invention, the concept of the present invention will be described.

Figure 1:
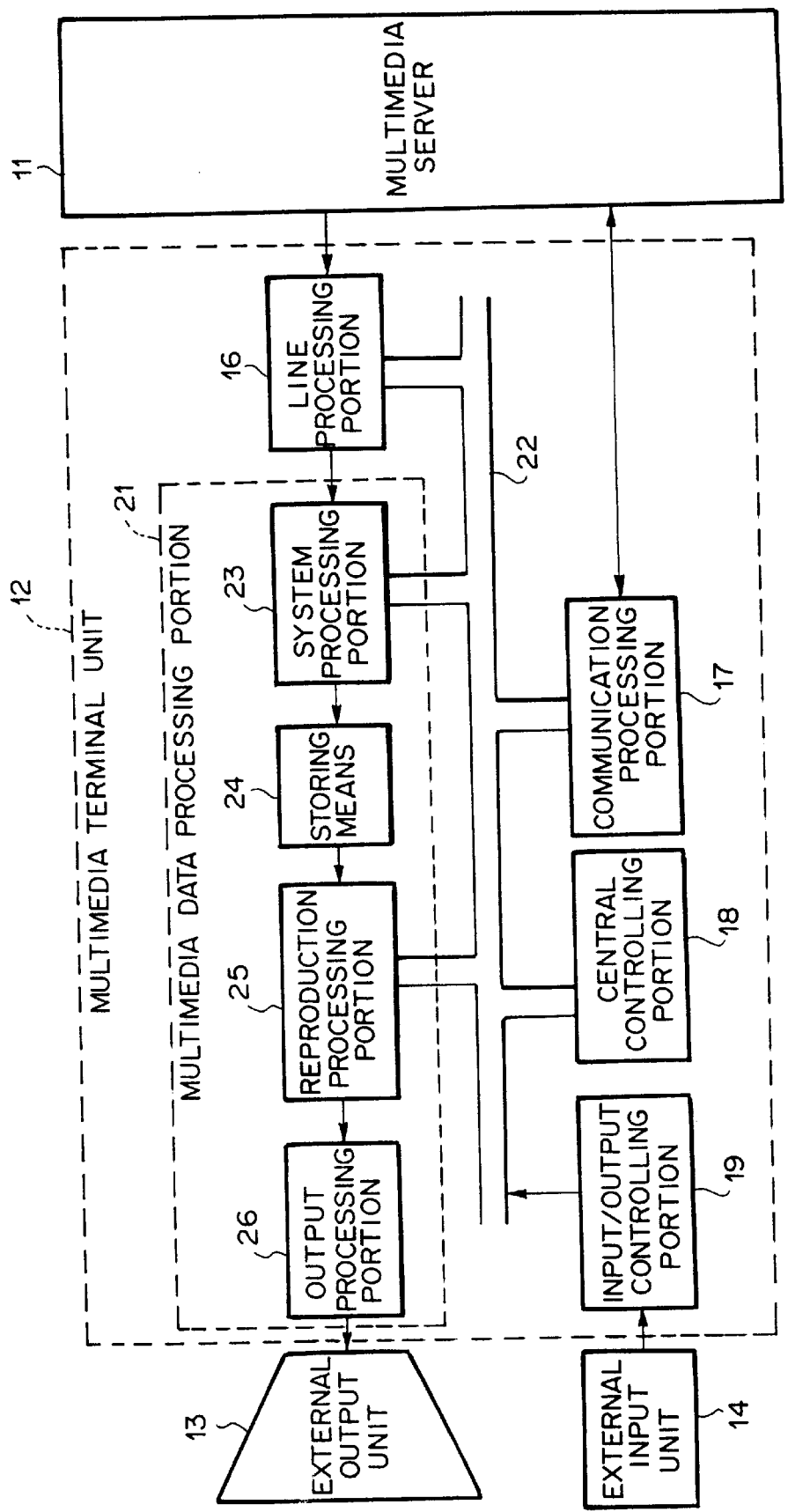
FIG. 1 is a block diagram showing the theoretical structure of a moving picture data reproducing system according to the present invention.

FIG. 1 is a block diagram showing the theoretical structure of a moving picture data reproducing system according to the present invention. The moving picture data reproducing system has a multimedia server 11 that stores compressed moving picture and audio data, retrieves them, sends them to a multimedia terminal unit 12, and communicates with a multimedia terminal unit 12. A multimedia terminal unit 12 communicates with the multimedia server 11, receives compressed moving picture and audio data, and reproduces moving picture and audio data. An external output unit 13 and an external input unit 14 are connected to the multimedia terminal unit 12.

The multimedia terminal unit 12 has a line processing portion 16 and a communication processing portion 17 that function as paths for input data from the multimedia server 11. The line processing portion 16 and the communication processing portion 17 are connected to a bus 22 along with a central controlling portion 18, an input/output controlling portion 19, and a multimedia data processing portion 21. The central controlling portion 18 controls the entire multimedia terminal unit 12. The input/output controlling portion 19 processes input data received from the external input unit 14. The multimedia data processing portion 21 processes moving picture and audio data. In addition, the multimedia data processing portion 21 has a system processing portion 23 that inputs compressed moving picture and audio data received from the line processing portion 16. The system processing portion 23 analyzes the compressed moving picture and audio data and separates them to a data portion of additional information and a data portion of pure compressed moving picture and audio data. The data portion of pure moving picture and audio is temporarily stored in a storing means 24 and then sent to a reproduction processing portion 25. The reproduction processing portion 25 reproduces moving picture and audio data according to the input data. The reproduced data are fed to an output processing portion 26. The output processing portion 26 converts the reproduced data into data suitable for the external output unit 13. The converted data are fed to the external output unit 13. The external output unit 13 outputs the reproduced moving picture and sound. The reproduction process, the stop process, the skip process, and so forth of the moving picture are performed corresponding to commands that are entered from the external input unit 14. When a command is entered to the external input unit 14, operation information thereof is fed to the central controlling portion 18. The central controlling portion 18 performs the relevant control process.

Figure 2:
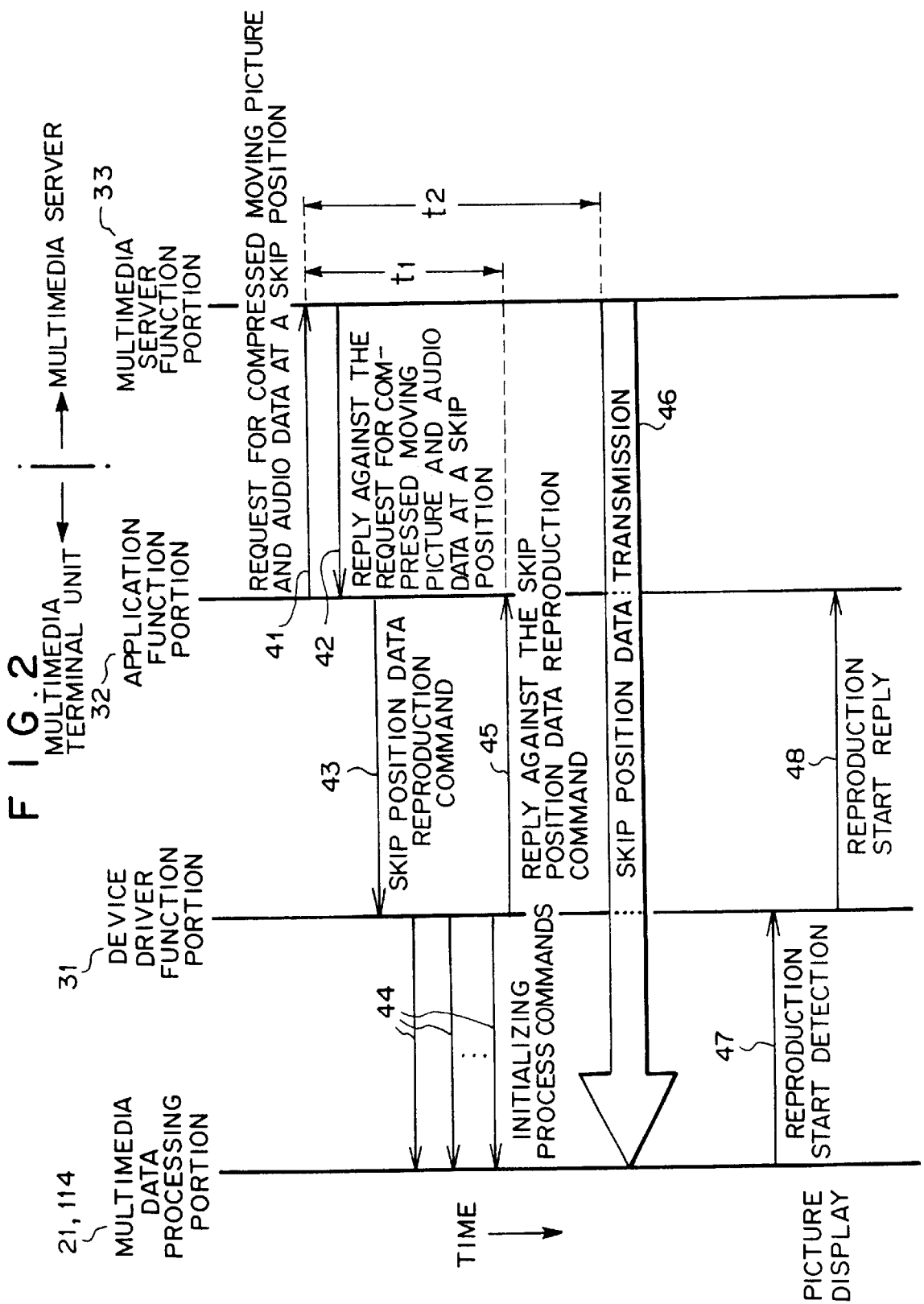
FIG. 2 is a sequence diagram showing a control sequence performed among control portions for reproducing data at a skip position according to the present invention.

FIG. 2 is a schematic diagram showing a control sequence performed among control portions of such a moving picture data reproducing system. Next, with reference to FIG. 2 along with FIG. 1, the control sequence performed among the control portions will be described. The moving picture data reproducing system has three function portions that are embodied by software. The other function portion, the multimedia data processing portion 21, is embodied by hardware. The three function portions are a device driver function portion 31, an application function portion 32, and a multimedia server function portion 33. The multimedia server function portion 33 retrieves compressed moving picture and audio data from the multimedia server 11 and communicates with the application function portion 32. The application function portion 32 controls communication between the multimedia data processing portion 21 and the multimedia server 11 and controls and gets information from the device driver function portion 31. The device driver function portion 31 controls the multimedia data processing portion 21 and communicates with the application function portion 32. The application function portion 32 analyzes user's commands through the device driver function portion 31.

In the case that the multimedia terminal unit 12 is reproducing moving picture and audio data and that a skip reproduction request for skipping the current moving picture to a desired moving picture is received from the external input unit 14, the application function portion 32 outputs a request for compressed moving picture and audio data at a skip position 41 to the multimedia server function portion 33. When the multimedia server function portion 33 has received the request for the compressed moving picture and audio data at the skip position 41, the multimedia server function portion 33 sends a reply 42 to the application function portion 32.

In this case, the compressed moving picture and audio data sent from the multimedia server 11 to the multimedia terminal 12 are stopped synchronizing with a minimum data block of the compressed moving picture and audio data so that the stop of the compressed moving picture and audio data does not disturb data reproduced by the reproduction processing portion 25. The multimedia server function portion 33 retrieves compressed moving picture and audio data at the designated skip position from the multimedia server 11 so as to prepare the transmission thereof.

When the application function portion 32 has received the reply 42 from the multimedia server function portion 33, the application function portion 32 sends a skip position data reproduction command 43 to the device driver function portion 31. Thus, the device driver function portion 31 sends initializing process commands 44 that will be described later to the multimedia data processing portion 21. The device driver function portion 31 sends a reply against the skip position data reproduction command 45 to the application function portion 32.

Figure 3:
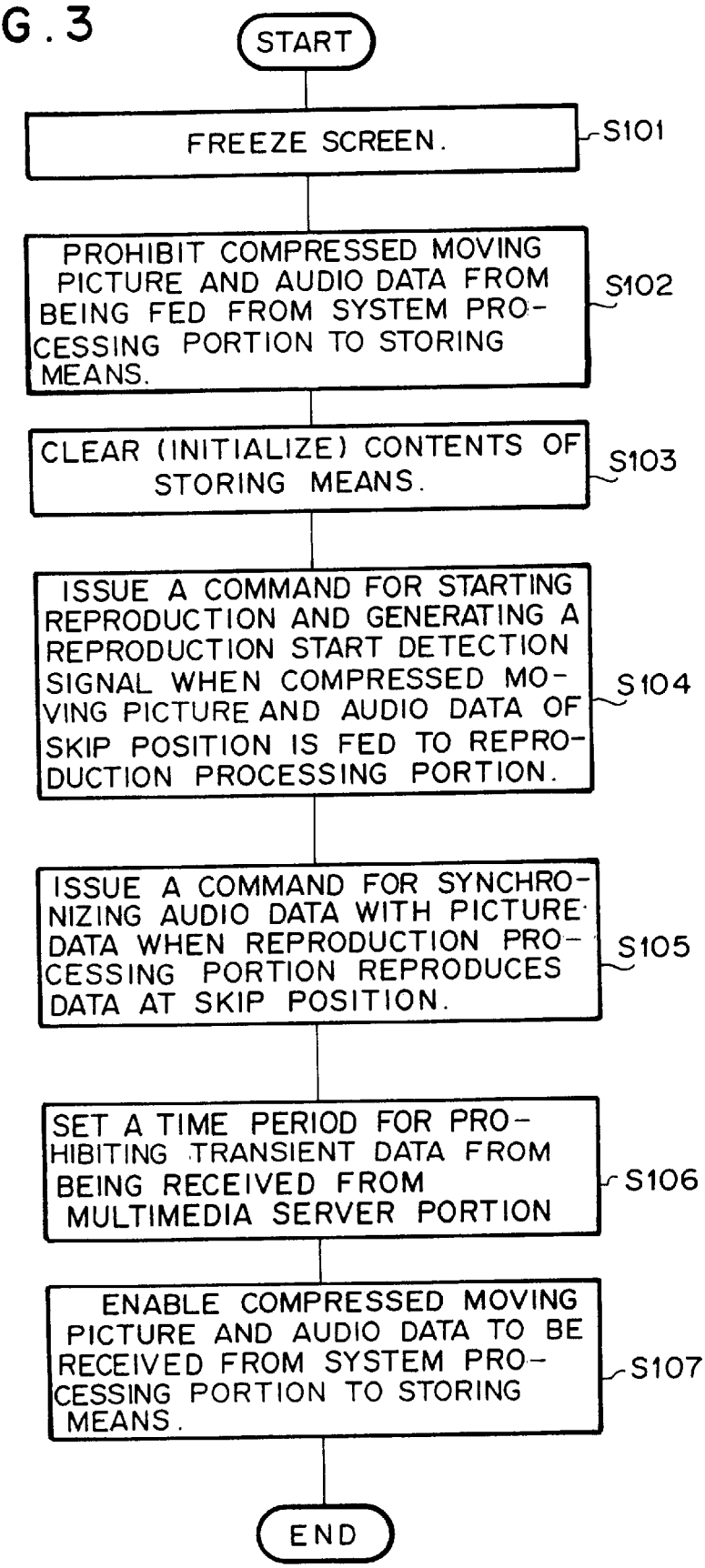
FIG. 3 is a flow chart showing an initializing process according to the present invention.

FIG. 3 is a flow chart showing the initializing process. Next, with reference to FIG. 3 along with FIG. 1, the initializing process will be described. The currently displayed picture on the external output unit 13 shown in FIG. 1 is frozen (at step S101). This is because during the initializing process is performed, the currently displayed picture is disturbed. Thus, the user can be prevented from seeing the disturbed picture. Next, the compressed moving picture and audio data are prohibited from being fed to the storing means 24 from the system processing portion 23 to prevent imperfect data from being stored in it until compressed moving picture and audio data at the designated skip position are received (at step S102). This is because since transient compressed moving picture and audio data, which are incomplete, may be received until compressed moving picture data at the designate skip position are received. Thereafter, the contents of the storing means 24 is cleared and initialized (at step S103).

Next, a command for starting the reproduction of the picture and audio data and generating a reproduction start detection signal when compressed moving picture and audio data at the designated skip position are fed to the reproduction processing portion 25 is issued to the reproduction processing portion 25 (at step S104). This is because the screen has been frozen at step S101. Thus, the timing for defrosting the picture should be obtained. Next, a command for synchronizing picture data and audio data at the time reproducing new data is issued (at step S105). This is because, when the current picture data are changed to the picture data at the designated skip position, the time continuity is lost.

Thereafter, the time period for prohibiting the compressed moving picture and audio data from being fed to the storing means 24 is set and the process halt for the time period (at step S106). This is because the transient incomplete compressed moving picture data must be prohibited from being received from the multimedia server 11. Last, it is enabled that the storing means 24 receives the new compressed moving picture data from the system processing portion 23 (at step S107).

Returning to FIG. 2, when the initializing process is completed, the device driver function portion 31 sends a reply against the skip position data reproduction command 45 to the application function portion 32. The time period after the request for compressed moving picture and audio data at a skip position 41 is issued until the reply against the skip position data reproduction command 45 is issued is denoted by t1.

After the application function portion 32 has issued the request for compressed moving picture and audio data at a skip position 41, when a time period t2 has elapsed, the multimedia server function portion 33 sends the compressed moving picture and audio data that start from the designated skip position received from the multimedia server 11 to the multimedia data processing portion 21. The skip position data are directly transmitted from the multimedia server function portion 33 to the multimedia data processing portion 21 without interventions of the application function portion 32 and the device driver function portion 31 (skip position data transmission 46).

When the multimedia data processing portion 21 starts reproducing a picture and audio data corresponding to the compressed moving picture and audio data that start from the designated skip position, the multimedia data processing portion 21 synchronizes audio data with picture data and sends a reproduction start detection signal 47 to the device driver function portion 31. Thus, the device driver function portion 31 defrosts the screen and displays the reproduced picture data that start from the designated skip position. At this point, the device driver function portion 31 sends a reproduction start reply 48 to the application function portion 32.

The elapsed time period t1 after the request for compressed moving picture and audio data at a skip position 41 is issued until the reply against the skip position data reproduction command 45 is issued and the required time period t2 after the request for compressed moving picture and audio data at a skip position 41 is issued until the skip position data transmission 46 is performed should satisfy the relation given by the following equation.

$$t1 < t2 \quad (1)$$

Unless such a relation is satisfied, part of data at the designated skip position cannot be reproduced. If the relation of the equation (1) is not satisfied, the required time period t2 should be adjusted by adjusting means such as timer. When the equation (1) is satisfied, the transmission timing of the compressed moving picture and audio data at the designated skip position sent from the multimedia server function portion 33 do not have to be adjusted with interventions of the application function portion 32 and the device driver function portion 31.

Next, an embodiment of the present invention will be described.

Figure 4:
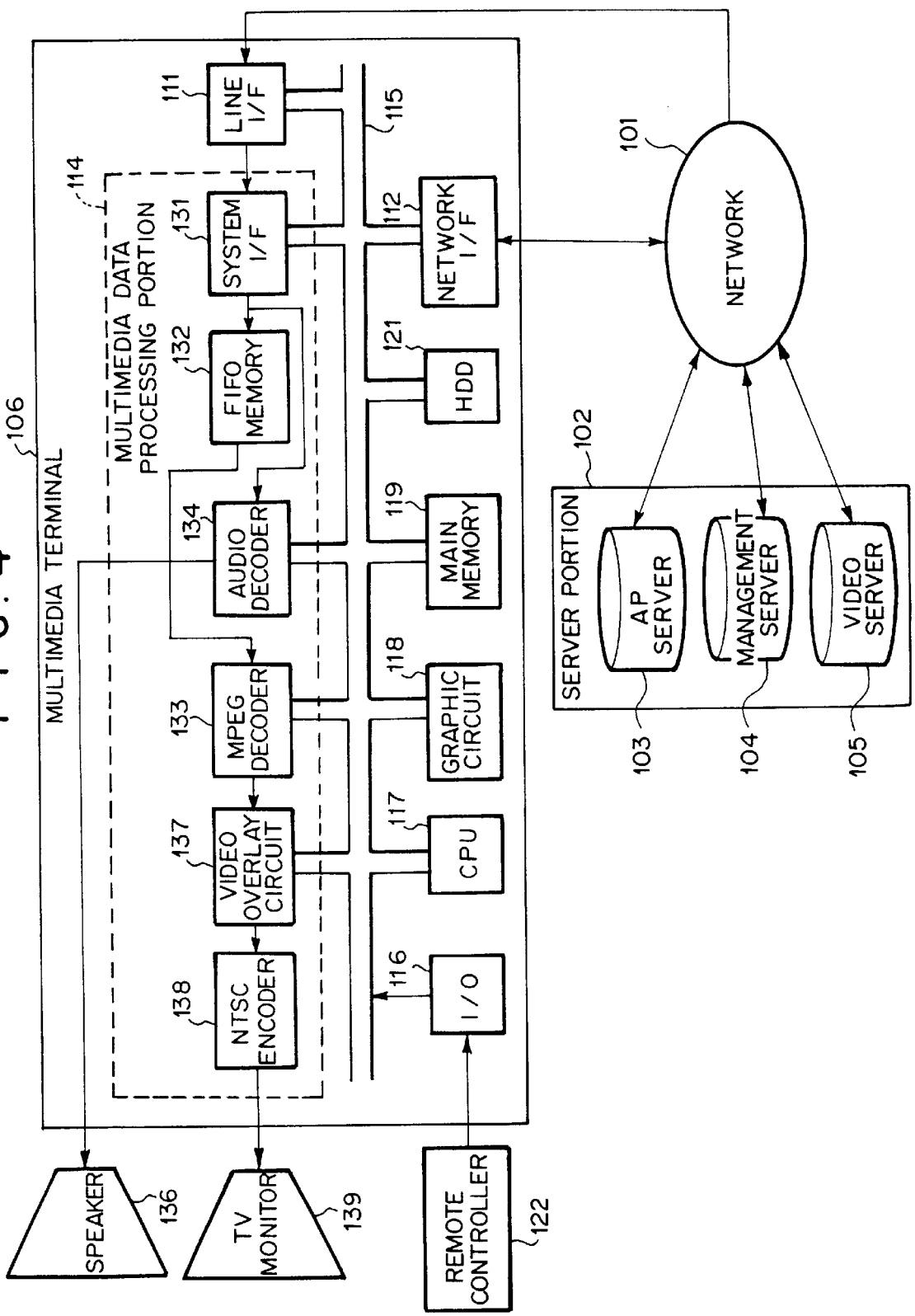
FIG. 4 is a block diagram showing the structure of a moving picture data reproducing system according to an embodiment of the present invention.

FIG. 4 is a block diagram showing the structure of a moving picture data reproducing system according to the embodiment of the present invention. The multimedia server 11 shown in FIG. 1 corresponds to a server portion 102 connected to a network 101 of the system. The server portion 102 has an AP server (application server) 103 that stores programs, a management server 104 that retrieves and manages compressed moving picture and audio data, and a video server 105 that registers and stores the compressed moving picture and audio data. The AP server 103 also has functions for registering and managing menu data and file data and sending data to an STB (Set Top Box).

A multimedia terminal unit 106 has a line interface (I/F) circuit 111 and a network interface circuit 112. The line interface (I/F) circuit 111 corresponds to the line processing portion 16 shown in FIG. 1. The network interface circuit 112 corresponds to the communication processing portion 17 shown in FIG. 1. As with the structure shown in FIG. 1, A part of the data that are transmitted from the server portion 102 and travel through the network work 101 are fed to a multimedia data processing portion 114 through the line interface circuit 111. And the other part is fed to a bus 115 through the network interface circuit 112. The input/output controlling portion 19 shown in FIG. 1 is composed of an input/output (I/O) circuit 116 in this embodiment. The central controlling portion 18 shown in FIG. 1 is composed of a CPU (Central processing Unit) 117, a graphic circuit 118, a main memory 119, and a HDD (hard disk drive unit) 121. The graphic circuit 118 is a circuit that is dedicated for a graphic process. The HDD 121 is an external storing unit. When necessary, another storing unit such as an optical disc unit can be used. The input/output circuit 116 according to the embodiment receives data from a remote controller 122 as the external input unit 14.

The multimedia data processing portion 114 has a system interface circuit 131 that corresponds to the system processing portion 23 shown in FIG. 1. Among a set of data that are received from the system interface circuit 131, only compressed moving picture data are fed to a FIFO (First-In First-Out) memory 132. The FIFO memory 132 corresponds to the storing means 24 shown in FIG. 1. The compressed moving picture data are delayed for a predetermined time period preserving the input order by the FIFO memory 132. Thereafter, the delayed compressed moving picture data are fed to an MPEG (Moving Picture coding Experts Group) decoder 133. The MPEG decoder 133 decodes MPEG data, which comprises compressed moving picture and audio data, to moving picture data. The audio data portion that is received from the system interface circuit 131 is fed to an audio decoder 134. The audio decoder 134 reproduces audio data. The reproduced audio signals are fed to a speaker 136 that corresponds to the external output unit 13 shown in FIG. 1. The speaker 136 makes sound according to audio data. The reproduced picture signals from the MPEG decoder 133 are fed to a video overlay circuit 137. The video overlay circuit 137 overlays the picture data from the MPEG decoder 133 with the picture data received from the graphic circuit 118. The resultant moving picture data are fed to an NTSC (National Television System Committee) encoder 138. The NTSC encoder 138 converts the data received from the video overlay circuit 137 into a color TV picture signal corresponding to the NTSC system. The resultant signal is fed to a television (TV) monitor 139 that corresponds to the external output unit 13 shown in FIG. 1. The TV monitor 139 displays a moving picture.

In the case that the user is watching a moving picture of a particular title on the multimedia terminal unit 106 of the moving picture data reproducing system according to the embodiment and wants to the multimedia terminal unit 106 to change the current reproduction picture to a moving picture at a certain position, the user inputs a skip position on a menu screen of the television monitor 139 with a remote controller 122.

The moving picture data reproducing system according to the embodiment has three function portions embodied by software and the other portion, the multimedia data processing portion 114, is embodied by hardware as shown in FIG. 2. The three function portions are the device driver function portion 31, the application function portion 32, and the multimedia server function portion 33. When the user inputs (designates) a desired skip position with the remote controller 122, the input/output circuit 116 outputs a skip position data request code. Thus, the application function portion 32 detects the skip position data request code through the device driver function portion 31 shown in FIG. 2. The application function portion 32 sends a request for compressed moving picture and audio data at a skip position 41 to the multimedia server function portion 33. In other words, the application function portion 32 requests the server portion 102 for the compressed moving picture and audio data at the designated skip position corresponding to the information that has been input on the menu screen with the remote controller 122 through the network interface circuit 112 and the network 101. When the multimedia server function portion 33 shown in FIG. 2 receives the request for compressed moving picture and audio data 41 from the application function portion 32, the multimedia server function portion 33 sends a reply 42 to the application function portion 32 and stops sending the current compressed moving picture data synchronizing with a block of 12 KB (kilo bytes) size. This data block is a minimum data element that does not disturb the reproduction of the picture data. When the application function portion 32 has received the reply 42 from the multimedia server function portion 33, the application function portion 32 sends a skip position data reproduction command 43 to the device driver function portion 31. Thus, the device driver function portion 31 sends initializing process commands 44 to the multimedia data processing portion 21 so as to perform the initializing process. The initializing process will be described in the following. And then, the device driver function portion 31 sends a reply against the skip position data reproduction command 45 to the application function portion 32.

Figure 5:
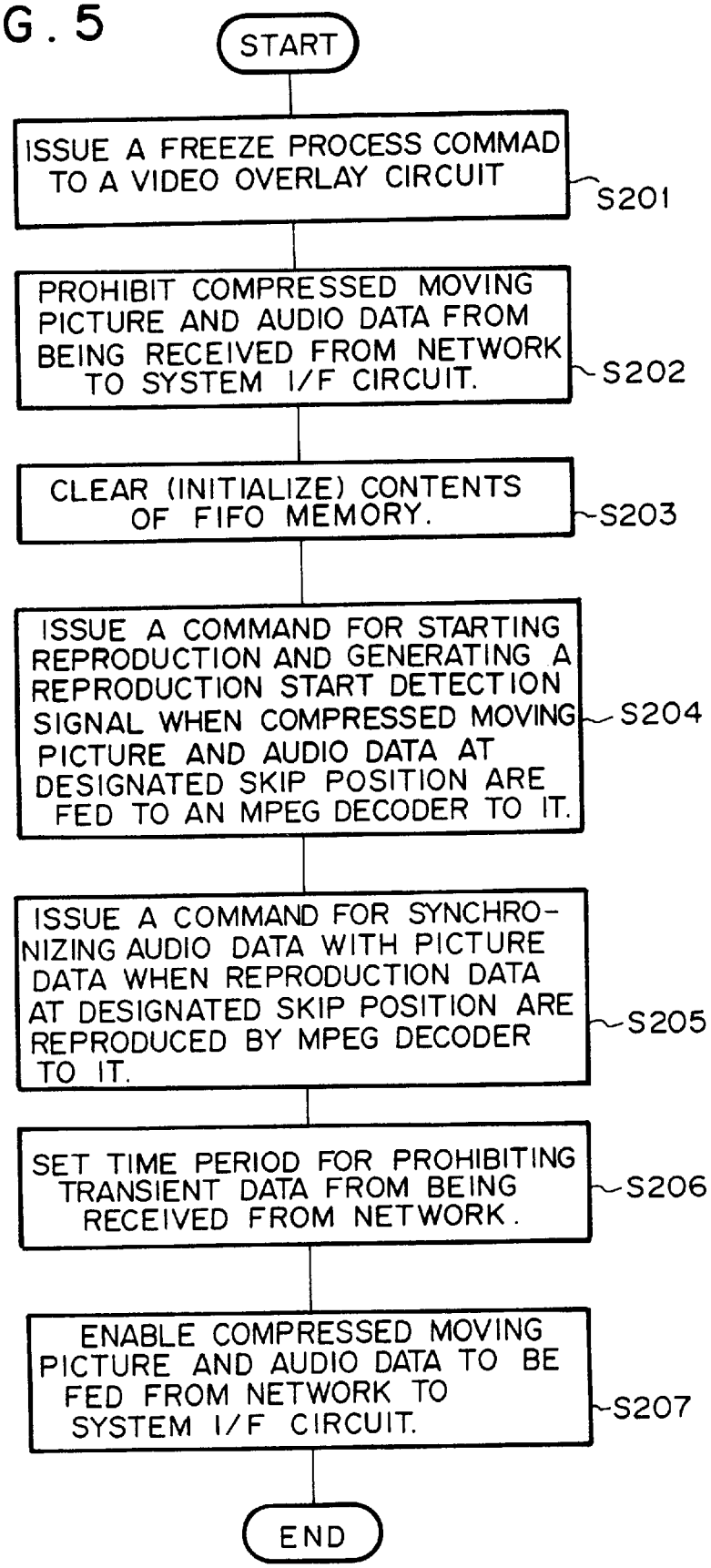
FIG. 5 is a flow chart showing the initializing process according to the embodiment of the present invention.

FIG. 5 is a flow chart showing the initializing process. Next, with reference to FIG. 5 along with FIG. 4, the initializing process will be described. A freeze process command is sent to the video overlay circuit 137 to make the current picture displayed on the screen of the television monitor 139 shown in FIG. 4 be frozen (at step S201) to ensure the picture that the user is seeing is prevented from being disturbed in the initializing process. Next, data are prohibited from being fed to the system interface circuit 131 (at step S202). Accordingly, the data are prohibited from being fed to the FIFO memory 132 and audio decoder 134. This is done to prevent imperfect data being stored in the FIFO memory 132 and fed to audio decoder 134 until the compressed moving picture data that start from the designated skip position are received. Thereafter, the contents of the FIFO memory 132 is cleared and initialized (at step S203). Next, a command for starting the reproduction of picture and audio data and generating a reproduction start detection signal when new data at a designated skip position are received is issued to the MPEG decoder 133 (at step S204). This is because the screen has been frozen at step S201. Thus, the timing for defrosting the picture should be obtained. Next, a command for synchronizing picture data and sound data at the time reproducing new data are issued to the MPEG decoder 133 (at step S205). This is because, when the current picture data are changed to the picture data at the designated skip position, the time continuity is lost.

Thereafter, the time period for prohibiting the compressed moving picture and audio data being fed to the system interface circuit 131 is set and the process halt for the time (at step S202). This is because the transient incomplete compressed moving picture data must be prohibited from being received from the server portion 102 through the network 101. Last, it is enabled that the system interface unit 131 receives the new data from the server portion 102 through the network 101 (at step S207).

Returning to FIG. 2, when the initializing process is completed, the device driver function portion 31 sends a reply against skip position data reproduction command 45 to the application function portion 32. It is assumed that the elapsed time after the request for compressed moving picture and audio data at a skip position 41 is issued until the reply against the skip position data reproduction command 45 is issued is denoted by t1.

When the application function portion 32 has sent the request for compressed moving picture and audio data at a skip position 41, the multimedia server function portion 33 causes the management server 104 to retrieve compressed moving picture and audio data stored in the video server 105 of the server portion 102 corresponding to the request information of the user. The management server 104 sends the resultant compressed moving picture and audio data at the designated skip position to the network interface circuit 112 through the network 101 (namely, the skip position data transmission 46 shown in FIG. 2). The required time period after the request for compressed moving picture and audio data at a skip position 41 is issued until the skip position data transmission 46 is performed is denoted by t2. The relation between the elapsed time period t1 and the required time period t2 should satisfy the above-described equation (1).

The network interface circuit 112 processes data corresponding to a predetermined communication protocol. The processed data are sent to the system interface circuit 131 through one of two paths. In other words, the processed data are sent to the system interface circuit 131 through the bus 115 and the line interface circuit 111. Alternatively, the processed data are directly sent from the network interface circuit 112 to the system interface circuit 131.

The former path is a data process path used in a VOD (Video On Demand) system of a LAN (Local Area Network) system. The compressed moving picture and audio data are sent to the multimedia data processing portion 114 through the bus 115. In other words, the compressed moving picture and audio data are sent to the multimedia data processing portion 114 through a communication board of the terminal unit. In the LAN system, since a CATV analog broadcast signal is not received, the compressed moving picture and audio data can be easily controlled by the CPU 117 through the network interface circuit 112 and the bus 115. In this case, the cost can be easily reduced corresponding to the system scale.

On the other hand, the latter case is a data processing path used in a VOD system of a CATV system. The compressed moving picture and audio data are directly sent to the multimedia data processing portion 114 not through the bus 115. In other words, the compressed moving picture and audio data are sent not through the communication board and the CPU 117. The received data are controlled indirectly by the CPU 117 that receives the control signal from the multimedia data processing portion 114. In the latter case, it is supposed that the signal source is switched to the CATV analog broadcast. In this case, the analog broadcast signal is directly displayed not through the decode processing portion.

The compressed moving picture and audio data received by the network interface circuit 112 are separated into a data portion of time information and additional information and a data portion of compressed moving picture data and audio data. The data portion of time information and additional information is discarded. The compressed moving picture data portion is fed to the FIFO memory 132. The audio data portion is fed to the audio decoder 134. The moving picture data and audio data are reproduced by the MPEG decoder 133 and the audio decoder 134. Thus, the MPEG decoder 133 outputs the reproduction start detection signal 47 (see FIG. 2) to the device driver function portion 31. Thus, the device driver function portion 31 sends a picture defrosting command to the video overlay circuit 137. Thus, the video overlay circuit 137 overlays the reproduced picture data with the graphic picture data received from the graphic circuit 118 and sends the resultant data to the NTSC encoder 138. The NTSC encoder 138 converts the data received from the video overlay circuit 137 into a signal for the television monitor 139. The resultant signal is fed to the television monitor 139. Thus, the user can see the reproduced picture. At this point, the reproduced sound is output from the speaker 136. The device driver function portion 31 sends the reproduction start reply 48 to the application function portion 32.

In such a manner, the response after the user designates a desired picture until it is displayed can be improved.

In the normal case, the relation between the elapsed time period t1 and the required time period t2 as expressed by the above-described equation (1) is satisfied. This is because, since the required time period t2 is a time period required for retrieving data at a designated skip position and read out them, the required time period t2 is larger than the elapsed time period t1. A real load test result shows that such a relation is satisfied. It is secure that the multimedia server function portion 33 sends the data that start from a skip position after receiving a reply from the application function portion 32 disposed in a lower hierarchical level than the multimedia server portion 33. However, in this case, the sequence time cannot be reduced. In contrast, according to the embodiment of the present invention, the sequence time can be reduced by around 50% in comparison with the case of which the multimedia server function portion 33 waits for the reply from the application function portion 32.

In the above-described embodiment, the remote controller 122 was used as the external input unit 14. However, it should be noted that another input means such as a keyboard for designating a picture can be used. For other function portions, other equivalent replacement can be used.

In the above-described embodiment, it is assumed that with respect to the relation between the elapsed time period t1 and the required time period t2, the latter is larger than the former. To securely maintain this relation, a timing adjusting circuit composed of a timer can be provided in the multimedia server function portion 33. With the timer setup, the delay time of the data transmission can be adjusted so as to assure the relation expressed by the equation (1).

According to the present invention, since the multimedia server function portion sends compressed moving picture and audio data to the multimedia data processing portion after a lapse of a predetermined time period after a skip reproduction command is issued, a part of the communication performed among control portions can be omitted and the response of the skip reproduction can be improved. In case user send commands to skip pictures continuously, the effect become remarkable.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A moving picture data reproducing method for a system having a server and a terminal, said server sending compressed moving picture and audio data to the terminal corresponding to a command issued from the terminal, and said terminal reproducing moving picture and audio data corresponding to the compressed moving picture and audio data, which comprises the steps of:

causing the server to start sending the compressed moving picture and audio data that start from a designated skip position after a lapse of a predetermined time period without a protocol performed in a control portion when the terminal sends a skip reproduction command to the server while the terminal is reproducing a moving picture; and causing the terminal to reproduce the moving picture and audio data that start from the designated skip position when the terminal receives the compressed moving picture data that start from the designated skip position.

2. The moving picture data reproducing method as set forth in claim 1, wherein the terminal prohibits the compressed moving picture and audio data from being reproduced after the terminal have sent the skip reproduction command to the server and until the terminal receives the compressed moving picture and audio data that start from the designated skip position from the server.

3. The moving picture data reproducing method as set forth in claim 1, wherein said compressed moving picture and audio data are MPEG data.

4. A moving picture data reproducing method for a moving picture data reproducing system having a multimedia server function portion for storing compressed moving picture and audio data and sending the compressed moving picture and audio data corresponding to a request, an application function portion having a user interface, a multimedia data processing portion for reproducing moving picture and audio data from the compressed moving picture and audio data, and a device driver function portion for controlling the multimedia data processing portion corresponding to the request issued from the application function portion, which comprises the steps of:

causing the application function portion to issue a request for compressed moving picture and audio data at a skip position to the multimedia server function portion when the application function portion has received a skip reproduction command from the user;

causing the multimedia server function portion to send a reply against the request for compressed moving picture and audio data at a skip position to the application function portion;

causing the application function portion to issue a skip position data reproduction command to the device driver function portion when the application function portion has received a reply against the request for compressed moving picture and audio data from the multimedia server function portion;

causing the device driver function portion to initialize the multimedia data processing portion when the device driver function portion has received the skip position data reproduction command;

causing the device driver function portion to send a reply against the skip position data reproduction command to the application function portion when the device driver function portion has completed the initializing process;

causing the multimedia server function portion to send the compressed moving picture and audio data that start from the designated skip position to the multimedia data processing portion after a lapse of a predetermined time period after the multimedia server function portion has received the request for compressed moving picture and audio data at a skip position from the application function portion;

causing the multimedia data processing portion to start reproducing moving picture and audio data corresponding to the compressed moving picture and audio data that start from the designated skip position and to send a reproduction start detection signal to the device driver function portion when the multimedia data processing portion has received the compressed moving picture data and audio data at the designated skip position; and causing the device driver function portion to send a reproduction start reply to the application function portion when the device driver function portion has received the reproduction start detection signal.

5. The moving picture data reproducing method as set forth in claim 4, wherein said initializing is performed by the steps of:

freezing a screen;

prohibiting the compressed moving picture and audio data from being fed to a storing means of the multimedia data processing portion from a system processing portion of the multimedia data processing portion;

clearing the contents of the storing means;

issuing a command to a reproduction processing portion of the multimedia data processing portion for starting reproducing the moving picture and audio data corresponding to the compressed moving picture and audio data that start from the designated skip position and generating the reproduction start detection signal when the compressed moving picture and audio data at the designated skip position are fed to the reproduction processing portion of the multimedia data processing portion;

issuing a command for synchronizing audio data with picture data at the time reproducing the moving picture and audio data at the designated skip position to the reproduction processing portion;

setting a time period for prohibiting the compressed moving picture and audio data from being fed to the storing portion from the system processing portion and waiting for the time period; and enabling the compressed moving picture and audio data to be fed to the storing means from the system processing portion.

6. The moving picture data reproducing method as set forth in claim 5, further comprising the step of:

defrosting the screen when the device driver function portion has received the reproduction start detection signal from the reproduction processing portion.

7. The moving picture data reproducing method as set forth in claim 4, further comprising the step of:

adjusting the time at which the multimedia server function portion sends the compressed moving picture and audio data at the designated skip position to the multimedia data processing portion so that the time at which the multimedia server function portion sends the compressed moving picture and audio data at the designated skip position to the multimedia data processing portion is preceded by the time at which the device driver function portion sends the reply against the skip position data reproduction command to the application function portion.

8. The moving picture data reproducing method as set forth in claim 4, wherein said compressed moving picture and audio data are MPEG data.

9. The moving picture data reproducing method as set forth in claim 5, wherein said reproduction processing portion is an MPEG decoder.

10. A moving picture data reproducing system having a multimedia server function portion for storing compressed moving picture and audio data and sending the compressed moving picture and audio data corresponding to a request, an application function portion having a user interface, a multimedia data processing portion for reproducing moving picture and audio data from the compressed moving picture and audio data, and a device driver function portion for controlling the multimedia data processing portion corresponding to the request issued from the application function portion, which comprises:

means for causing the application function portion to issue a request for compressed moving picture and audio data at a skip position to the multimedia server function portion when the application function portion has received a skip reproduction command from the user;

means for causing the multimedia server function portion to send a reply against the request for compressed moving picture and audio data at a skip position to the application function portion;

means for causing the application function portion to issue a skip position data reproduction command to the device driver function portion when the application function portion has received the reply against the request for compressed moving picture and audio data at a skip position from the multimedia server function portion;

means for causing the device driver function portion to initialize the multimedia data processing portion when the device driver function portion has received the skip position data reproduction command;

means for causing the device driver function portion to send a reply against the skip position data reproduction command to the application function portion when the device driver function portion has completed the initializing process;

means for causing the multimedia server function portion to send the compressed moving picture and audio data that start from the designated skip position to the multimedia data processing portion after a lapse of a predetermined time period after the multimedia server function portion has received the request for compressed moving picture and audio data from the application function portion;

means for causing the multimedia data processing portion to start reproducing moving picture and audio data corresponding to the compressed moving picture and audio data that start from the designated skip position and to send a reproduction start detection signal to the device driver function portion when the multimedia data processing portion has received the compressed moving picture data at the designated skip position; and means for causing the device driver function portion to send a reproduction start reply to the application function portion when the device driver function portion has received the reproduction start detection signal.

11. The moving picture data reproducing system as set forth in claim 10, wherein said initializing is performed by the steps of:
freezing a screen;
prohibiting the compressed moving picture and audio data from being fed to a storing means of the multimedia data processing portion from a system processing portion of the multimedia data processing portion;
clearing the contents of the storing means;
issuing a command to a reproduction processing portion of the multimedia data processing portion for starting reproducing moving picture and audio data corresponding to compressed moving picture and audio data that start from the designated skip position and generating the reproduction start detection signal when the compressed moving picture and audio data that start from the designated skip position are fed to the reproduction processing portion of the multimedia data processing portion;
issuing a command for synchronizing sound data with picture data at the time reproducing the moving picture and audio data corresponding to compressed moving picture and audio data at the designated skip position to the reproduction processing portion;
setting a time period for prohibiting the compressed moving picture and audio data from being fed to the storing portion from the system processing portion and waiting for the time period; and
enabling the compressed moving picture and audio data to be fed to the storing means from the system processing portion.

12. The moving picture data reproducing system as set forth in claim 11, further comprising:

means for defrosting the screen when the device driver function portion has received the reproduction start detection signal from the reproduction processing portion.

13. The moving picture data reproducing system as set forth in claim 10, further comprising:

means for adjusting the time at which the multimedia server function portion sends the compressed moving picture and audio data at the designated skip position to the multimedia data processing portion so that the time at which the multimedia server function portion sends the compressed moving picture and audio data at the designated skip position to the multimedia data processing portion is preceded by the time at which the device driver function portion sends the reply against the skip position data reproduction command to the application function portion.

14. The moving picture data reproducing system as set forth in claim 10, wherein said compressed moving picture and audio data are MPEG data.

15. The moving picture data reproducing system as set forth in claim 11, wherein said reproduction processing portion is an MPEG decoder.

* * * * *